Sept. 13, 1949. G. C. T. LINDH 2,481,602
METHOD FOR FORMING THERMOPLASTIC INNER SOLES
Filed Feb. 28, 1944
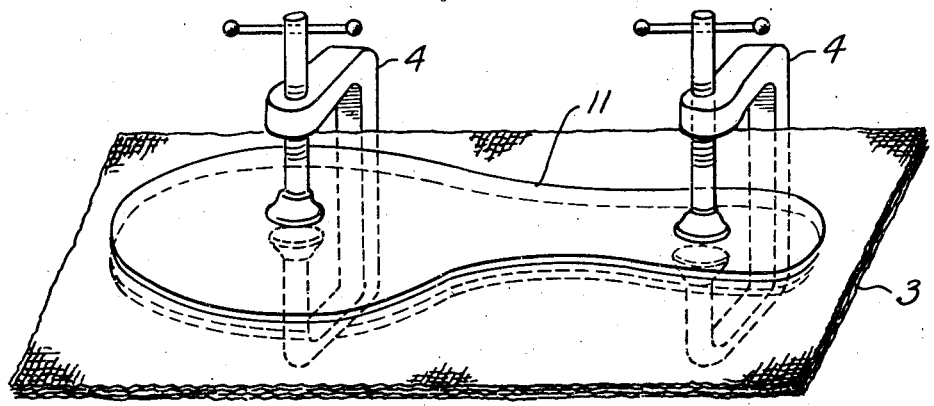
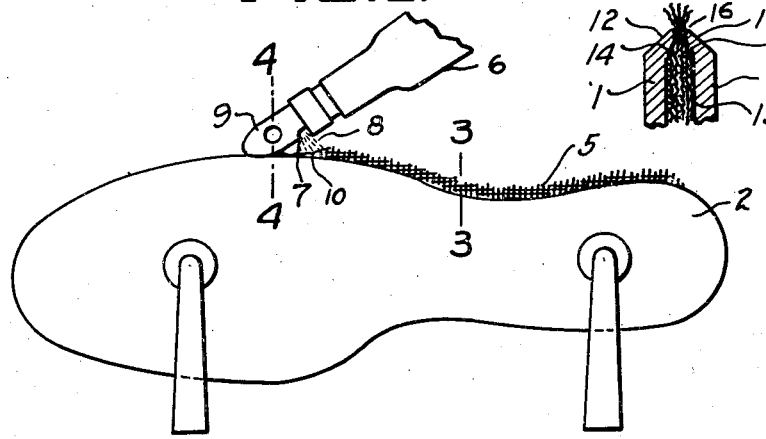
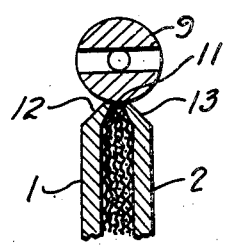
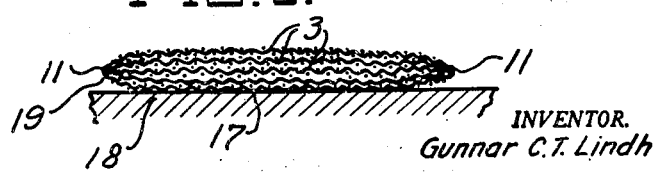
INVENTOR.
Gunnar C. T. Lindh
BY
Barnes, Kisselle, Laughlin & Raisch
Attorneys Patented Sept. 13, 1949

2,481,602

UNITED STATES PATENT OFFICE 2,481,602

METHOD FOR FORMING THERMOPLASTIC INNER SOLES

Gunnar C. T. Lindh, Detroit, Mich., assignor to The Udylite Corporation, Detroit, Mich., a corporation of Delaware Application February 28, 1944, Serial No. 524,194

6 Claims. (Cl. 154—116)

This invention relates to a method for forming a thermoplastic inner sole.

In prior application Serial No. 511,560, filed November 24, 1943, there is shown an inner sole for a shoe fabricated from laminated, porous webs of thermoplastic material welded together along their edges and a method and apparatus for producing such an inner sole. Such inner soles when worn in shoes have proved effective from the standpoint of ventilating the feet of the person wearing the shoes and thereby assisting in preventing the growth of bacteria and fungi which are the cause of some foot diseases. However, this prior inner sole has proved to have one disadvantage; namely, the weld joint which bonds the woven sheets together along the edge of the inner sole has proved to be rather rigid and sharp and has tended in some instances to cut into the feet of the wearer of the shoes.

It is the object of this invention to obviate the above described disadvantage and produce an inner sole of laminated woven or foraminated sheets of thermoplastic material which is soft and flexible, acts as an excellent cushion, provides the necessary ventilation for the feet of the wearer of the shoes, and is devoid of sharp edges which would in anywise cause discomfort to the wearer.

Fig. 1 is a perspective showing the laminated sheets clamped between the inner sole templets.

Fig. 2 is a plan view illustrating the welding step.

Figs. 3 and 4 are sections along the lines 3—3 and 4—4 of Fig. 2.

Fig. 5 is a cross-section of the finished inner sole.

In fabricating the inner sole there is provided a pair of templates 1 and 2 having the contour of the inner sole to be fabricated. A plurality of porous or foraminated sheets or webs 3 of thermoplastic material are placed one upon the other to form a laminated structure. The form of these foraminated sheets is not critical, but preferably the foraminated sheets consist of screening woven from thermoplastic thread. This woven thermoplastic screen is commonly used for screening out insects. The number of sheets 3 of screening can be varied depending upon the type of shoe into which the inner sole is inserted. Four or five plies or sheets of thermoplastic screening will provide an inner sole having a thickness sufficient to provide the requisite ventilation. The thermoplastic screen is also preferably positioned so that the threads of some of the sheets will run diagonally and non-parallel to the threads of some of the other sheets.

A plurality of sheets 3 of foraminated thermoplastic are next clamped between the templets 1 and 2 by clamps 4, the templets 1 and 2 first being accurately aligned so that their peripheries coincide. The sheets 3 are cut roughly to size, preferably about the templets 1 and 2 with a small overhang 5 completely around the periphery of the templets. However, the sheets can be cut to a size slightly larger than the templets before being clamped between the same. This overhanging portion 5 provides the welding material for welding the sheets 3 together and therefore should be wide enough to provide sufficient weld material for this purpose. An overhang of about one-eighth of an inch to about one-quarter of an inch has been found sufficient. Any overhanging material 5 in excess of that required to effect a good weld is wasted. Therefore, the overhang should preferably be as small as is commensurate with the obtaining of a good weld.

Since it is an object of this invention to do away with any peripheral weld bond which would cause discomfort to the user of the cushion or inner sole, to this end it is proposed to compress or place the laminated sheets under relatively higher pressure along the peripheral edges than throughout the remaining portion of the sheets preparatory to welding the same. To achieve this purpose the templets 1 and 2 are each provided with a peripheral rim 12 and 13, respectively. These rims extend completely around the periphery of the templet and are preferably arcuate in section as at 14 so that the inner faces of templets 1 and 2 are provided with a central flat or plane area 15 and a curved circumferential rim 14 around their edges. The edges of rims 12 and 13 where they contact and press against the thermoplastic sheets as at 16 are preferably as narrow as possible and yet sufficiently wide to prevent cutting or severing of sheets 3 along their edges. The pressure applied by rims 12 and 13 to sheets 3 along the periphery of the templets is sufficient so that the threads of the outer webs of thermoplastic material are preferably pressed downwardly or inwardly between the threads of the inner webs of thermoplastic material. The templets hold the sheets under pressure throughout the flat areas 15 of the templets but the point is that at the outer edges of the templets the pressure is greater and more concentrated so that the overall thickness of the edge portion of the laminated sheets is much less than that of the laminated sheets within the edges. Thus, the edge portion of the laminated sheets which is gripped and compressed between the rims 12 and 13 is considerably reduced from or less than the total or combined thicknesses of the plurality of sheets 3 of thermoplastic screen.

The sheets 3 are now ready for welding around their edges. This welding is effected by means of a torch 6, preferably such as described in the copending application of High and Lindh, Serial No. 511,560, filed November 24, 1943, which has become Patent No. 2,407,495. The torch 6 is provided with an exhaust port 7 through which flows a hot gas blast 8 having a temperature sufficiently high to heat the thermoplastic material somewhere between its softening point and charring point. The hot gases forming the blast 8 preferably should be inert to the thermoplastic material and can be heated in any desirable manner such as by passing the gas over a hot electrical resistance element or the hot gas can consist of the hot gaseous products of combustion of a combustible gas and air. The torch 6 should also be provided with an ironing tip 9 arranged to be heated to a point somewhere between the softening point and charring point of the thermoplastic material. The ironer 9 can be heated in any suitable manner but preferably is heated as described in the above-mentioned copending application, that is, by the hot gases from torch 6 preparatory to being exhausted from the torch.

The torch is drawn along the templets in the direction indicated by the arrow Fig. 2. The hot gas blast 8 strikes the overhang 5 and melts the same down to form molten thermoplastic weld material which can be designated 10. As this molten weld material is formed by the blast 8, hot ironer 9 slides along the peripheries of the templets 1 and 2 and thereby irons and smooths out the molten weld material to form a smooth, homogeneous weld joint 11 along the periphery of the inner sole. The ironing tip 9 preferably is a segment of a spheroid so that the weld joint 11 which bonds the sheets 3 together is dished slightly inwardly. Any excess weld material is cut off by the coaction of the ironer 9 with the inner edges of the templets 1 and 2 so that the weld joint or seam is smooth and clean.

This manner of welding joins together at the seam joint all of the threads of the several sheets and effectively prevents any loose ends of the threads from sticking up which would act like barbs and provide a very uncomfortable inner sole. This method of welding forms a clean, smooth and homogeneous joint which seals the several plies together along the edge of the inner sole.

Although the above method of welding is useful on all thermoplastic materials, it is particularly useful and commercially well adapted for welding the vinyl resins or thermoplastic polymerized vinyl compounds such, for example, as "Saran B-115," a trade name for a copolymer of vinylidene chloride and vinyl chloride, "Saran F-125," a trade name for a copolymer of vinylidene chloride and vinyl cyanide, "Vinylite," a trade name for a copolymer of vinyl chloride and vinyl acetate, polystyrene (polymerized styrene), polymers of vinyl benzene, polymers of vinyl chloride, polymers of vinyl acetate.

This method of welding permits one to accurately control the temperature to which the thermoplastic material is raised so that the material never reaches its thermal decomposition temperature. Therefore, the joint 11 consists of the same material having the same chemical properties as the thermoplastic material forming the remainder of the inner sole. The physical properties of the material forming the joint are also substantially unchanged and the same as the physical properties of the material forming the remainder of the inner sole.

It is evident from the above description that this method and apparatus is generally useful in the welding of laminated thermoplastic materials, particularly where the laminations are to be joined along their edges.

It will be seen that in its final form the inner sole or cushion 17 is provided with a very narrow weld joint 11 around its periphery and that in section, Fig. 5, the cushion is convex, that is, the weld joint 11 is considerably narrower than the thickness of the cushion within the periphery. Actually the outer laminations 3 of the cushion 17 are arched and have a greater area than the laminations within. This arching or the convex form of the outer laminations within the weld joint 11 enhances the cushioning effect of the cushion. It is also evident that this arching or convex exterior form of the cushion 17 serves to shield or prevent the foot of the wearer from coming in contact or resting upon the welded joint 11 along the edge of the cushion. As shown in Fig. 5, the cushion is resting upon a support 18, such as the inner face of the sole of a shoe. If a load in the form of a foot, for example, is now applied upon cushion 3, it will be seen that the load will be borne practically entirely by the cushion within the peripheral joint 11 and that the lower edge 19 of joint 11 does not rest upon the support 18. In taking the load, cushion 3 will somewhat flatten out but substantially the entire load will be borne by the cushion within the peripheral joint 11 by the time the lower edge 19 of the joint 11 contacts or comes near to contacting support 18. Thus, practically speaking, joint 11 is not a load bearing member, i. e., the foot may contact joint 11 but substantially all the load is borne by the arched or convex cushion within the peripheral joint. Hence, since joint 11 is substantially non-load bearing, it does not cut into the foot of the wearer or user of the inner sole.

I claim:

1. The method of welding a plurality of sheets of thermoplastic material along their edges comprising the following steps: placing the sheets with their larger faces in contact, pressing the sheets together along their edges to a thickness less than the total thicknesses of the sheets, applying heat to the compressed edges of said sheets to melt the same at a temperature below the thermal decomposition point of the thermoplastic material, and then smoothing off the melted edge portions to form a homogeneous joint along the edges of said sheets.

2. The method of welding a plurality of sheets of thermoplastic material along their edges comprising the following steps: holding the sheets under pressure with their larger faces in contact and their edges substantially in alignment, the pressure applied to the periphery of said sheets being greater per unit of area than the pressure applied to the sheets within the periphery whereby the sheets are compressed to a greater extent at the periphery than within the periphery, applying a hot gaseous blast along the edges of said sheets to melt the edges at a temperature below the thermal decomposition point of the thermoplastic, and while in a molten condition ironing the melted edge portions to form a smooth weld joint along the edges of said thermoplastic sheets.

3. The method of welding a plurality of sheets of thermoplastic material along their edges comprising the following steps: pressing a plurality of sheets of thermoplastic material between opposed pressure members provided with opposed peripheral flanges with the edge portions of the thermoplastic sheets overhanging the peripheral flanges of the pressure members, applying a hot gaseous blast to the overhanging edges to melt the same, and guiding an instrument along the edge of the pressure members to level off and smooth out the melted edge portion of the thermoplastic sheets to form a weld joint at the edges of the said sheets.

4. The method of fabricating an inner sole for a shoe, comprising pressing a plurality of foraminated sheets of thermoplastic material between opposed concave templets having the contour of the inner sole to be formed with the said sheets overhanging the edges of the templets, applying heat to the overhanging thermoplastic material to melt the same at a temperature below the thermal decomposition point of the thermoplastic, and hot-ironing the melted material to form a weld joint at the edges of the thermoplastic sheets along the periphery of the opposed templets.

5. The method of fabricating an inner sole for a shoe, comprising pressing a plurality of foraminated sheets of thermoplastic material between opposed concave templets having opposed peripheral flanges with the thermoplastic sheets overhanging the templets along their periphery whereby the said sheets are compressed to a greater extent between the opposed peripheral flanges than in the area within the opposed peripheral flanges, applying heat to the edges of the thermoplastic sheets to melt the same, and then drawing a hot instrument along the peripheries of the templets to level off and smooth the molten thermoplastic material to form a smooth weld joint.

6. The method of welding a plurality of sheets of thermoplastic material along their edges comprising the following steps: placing the sheets with their larger faces in contact, pressing the sheets together along their edges to a thickness less than the total thicknesses of the sheets and thereafter applying heat to the compressed edges of said sheets to melt the same at a temperature below the thermal decomposition point of the thermoplastic material, and then smoothing off the melted edge portions to form a homogeneous joint along the edges of said sheets.

GUNNAR C. T. LINDH.

REFERENCES CITED

The following references are of record in the file of this patent:

UNITED STATES PATENTS

| Number | Name | Date |
|---|---|---|
| 1,815,843 | Higdem | July 21, 1931 |
| 2,121,604 | Lynch et al. | June 21, 1938 |
| 2,220,545 | Reinhardt | Nov. 5, 1940 |
| 2,232,640 | Schwartzman | Feb. 18, 1941 |
| 2,322,298 | Johnston | June 22, 1943 |
| 2,407,495 | High et al. | Sept. 10, 1946 |
| 2,425,388 | Oestricher | Aug. 12, 1947 |